United States Patent [19]

Carter et al.

[11] 3,817,640

[45] June 18, 1974

[54] BALL JOINT GAUGE

[75] Inventors: Warren E. Carter; Hubert D. Songer, both of Murfreesboro, Tenn.

[73] Assignee: Perfect Equipment Corp., Murfreesboro, Tenn.

[22] Filed: Dec. 4, 1972

[21] Appl. No.: 312,181

[52] U.S. Cl. .................................. 403/138, 188/1 A
[51] Int. Cl. ............................................. F16c 11/06
[58] Field of Search ........... 403/132, 137, 138, 144, 403/27, 124, 131; 116/114 Q; 188/1 A

[56] References Cited
UNITED STATES PATENTS

| | | | |
|---|---|---|---|
| 2,187,915 | 1/1940 | Ruffo | 403/137 |
| 2,507,087 | 5/1950 | Booth | 403/132 X |
| 2,569,823 | 10/1951 | Moskovitz | 403/132 |
| 2,811,377 | 10/1957 | Latzen | 403/137 |
| 2,905,277 | 9/1959 | Cagle | 188/1 A X |
| 3,409,317 | 11/1968 | Richards | 403/138 |

FOREIGN PATENTS OR APPLICATIONS
456,942   11/1936   Great Britain ..................... 403/138

Primary Examiner—Werner H. Schroeder
Attorney, Agent, or Firm—Harrington A. Lackey

[57] ABSTRACT

A gauge for ball joints employed in the steering linkages and suspension systems of motor vehicles, including a gauge member bearing against the pressure or bearing plate seating the spherical-shaped head of the stud within the housing of the ball joint. A cover member, fixed in the open end of the housing opposite the socket member, is provided with a reference surface registrable with the axial movement of the gauge member to indicate the wear of the spherical head against the socket member. A first annular elastic member is compressed between the pressure plate and the cover member, while a second annular elastic member is compressed between the body portion of the gauge member and the cover member.

8 Claims, 4 Drawing Figures

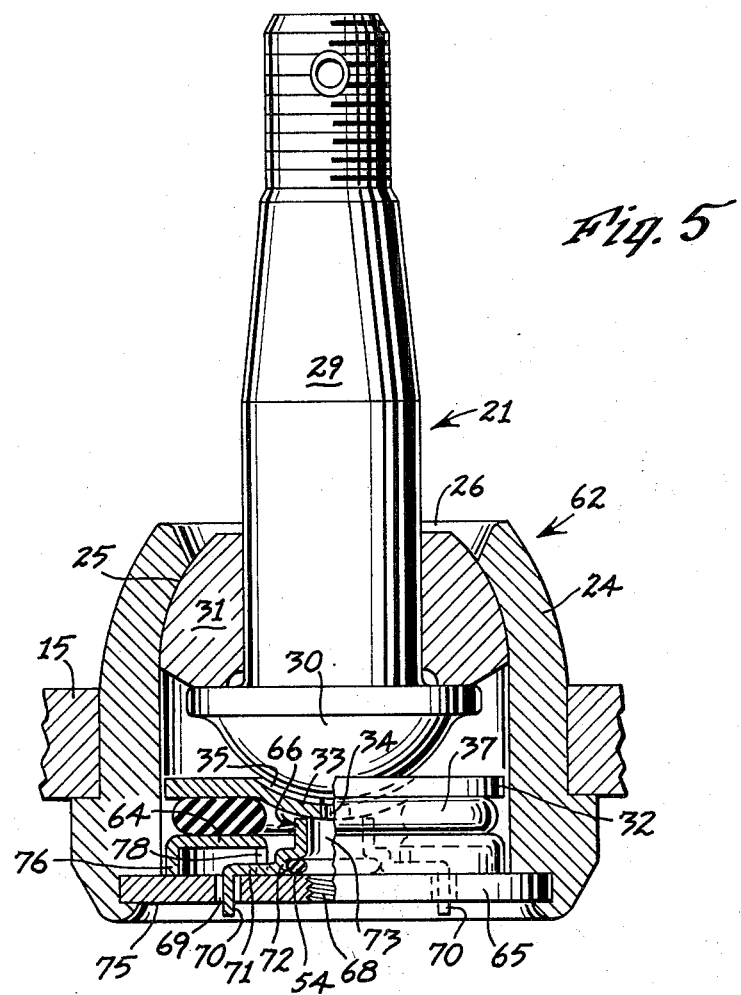

BALL JOINT GAUGE

BACKGROUND OF THE INVENTION

This invention relates to ball joints, and more particularly to a gauge for a ball joint employed in the suspension system of a motor vehicle.

One of the problems in the maintenance of motor vehicles is the determination of wear, and the detection of such wear, within a ball joint to determine when it should be replaced.

It has fairly well been determined by automotive engineers that a ball joint should be replaced in a vehicle suspension system when axial wear exceeds approximately 0.050 inches. Although such a standard is generally acceptable, nevertheless there are exceptions, such as a permissible axial wear of 0.070 inches in some of the Chrysler Motor Company's vehicles.

The conventional method of detecting the wear in ball joints is to neutralize the load on the load-bearing ball joint by jacking up the frame portion of the vehicle supporting the ball joint. Then by applying a pry bar beneath the tire and pushing against the ground, the wheel is lifted up and down to move the stud and ball axially within the socket of the ball joint. The extent of movement can be measured by means of a dial indicator. Obviously, this procedure requires a considerable amount of time and labor.

SUMMARY OF THE INVENTION

It is therefore an object of this invention to provide a ball joint including its own gauge for rapid determination of wear in the joint by mere inspection. Furthermore, if the gauge is not readily visible, the amount of wear may be readily determined by feeling the gauge and its degree of registration with the reference surface.

Another object of this invention is to provide a self-contained gauge for a ball joint in which all of the internal movable parts of the gauging components are sealed to prevent entry of foreign matter, such as dirt, road salts and water.

The ball joint gauge made in accordance with this invention includes a conventional ball joint housing having openings at both ends with a concave socket member at one end for receiving the spherical or ball-shaped head of the stud for universal movement, the shank portion of the stud projecting through the opening at the socket end. The gauge member comprises a unitary, preferably solid, body portion having a sight portion, the body portion bearing against a pressure or bearing plate, which in turn bears against the head. An annular elastic or spring member, such as a rubber ring is compressed against the pressure plate by a retainer element or plate fixed relative to and within the housing by engagement with a cover member or plate fixed within the opposite open end of the housing. The sight portion of the gauge member projects through an opening in the cover member where it is free to axially move as the ball wears in the socket, the sight portion being registrable with a fixed reference surface on the cover member to indicate the amount of axial wear.

A second annular elastic member, such as a rubber ring is compressed between a portion of the cover member and the body portion of the gauge member. In this manner, the compressed first elastic member continually urges the pressure plate and ball tightly against the socket, while the second compressed elastic member urges the body portion of the gauge member against the pressure plate, so that all the internal elements of the ball joint, including the gauging element, fit tightly, to minimize wear when the ball joint is subjected to vibration in the operation of the motor vehicle.

The retainer element or plate is also preferably fitted around the gauge member in such a manner as to prevent rotation of the gauge member relative to the housing.

BRIEF DESCRIPTION OF THE DRAWINGS

FIG. 4 is a bottom plan view, similar to FIG. 2, of a modified ball joint gauge; and FIG. 5 is a section taken along the line 5—5 of FIG. 4.

DESCRIPTION OF THE PREFERRED EMBODIMENT

Figure 1:
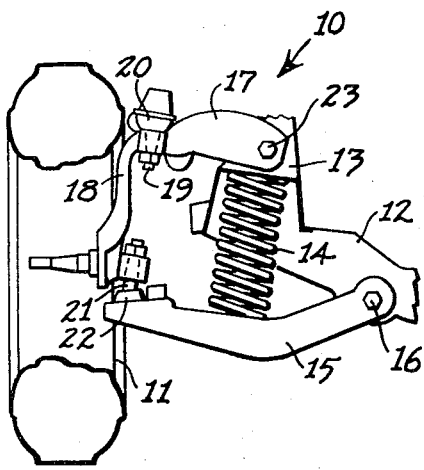
FIG. 1 is an elevational view of a portion of a front end suspension system for a motor vehicle incorporating the ball joint gauge in accordance with this invention.

Referring now to the drawings in more detail, FIG. 1 discloses a portion of a front-end suspension system 10 for a motor vehicle, for supporting one of the front steerable wheels 11. The frame 12 carries an upper spring bearing member 13 for the coil spring 14, the lower end of which bears against the lower control arm 15 hinged by the journal member 16 to the frame 12. An upper control arm 17 is hinged by the journal member 23 to the upper portion of the frame 12. The wheel 11 is mounted upon the steering knuckle 18, the upper end of which is connected to the stud 19 of the upper ball joint 20 carried by the upper control arm 17. The lower portion of the steering knuckle 18 is connected to the stud 21 of the lower ball joint 22 carried by the lower control arm 15. In this front-end suspension system 10, the lower ball joint 22 is a load-carrying ball joint, which causes the most concern about the wear of the ball portion of the stud relative to the socket. Accordingly, it is the ball joint 22 and cooperating stud 21 which are constructed in accordance with this invention to include the self-contained gauge.

Figure 3:
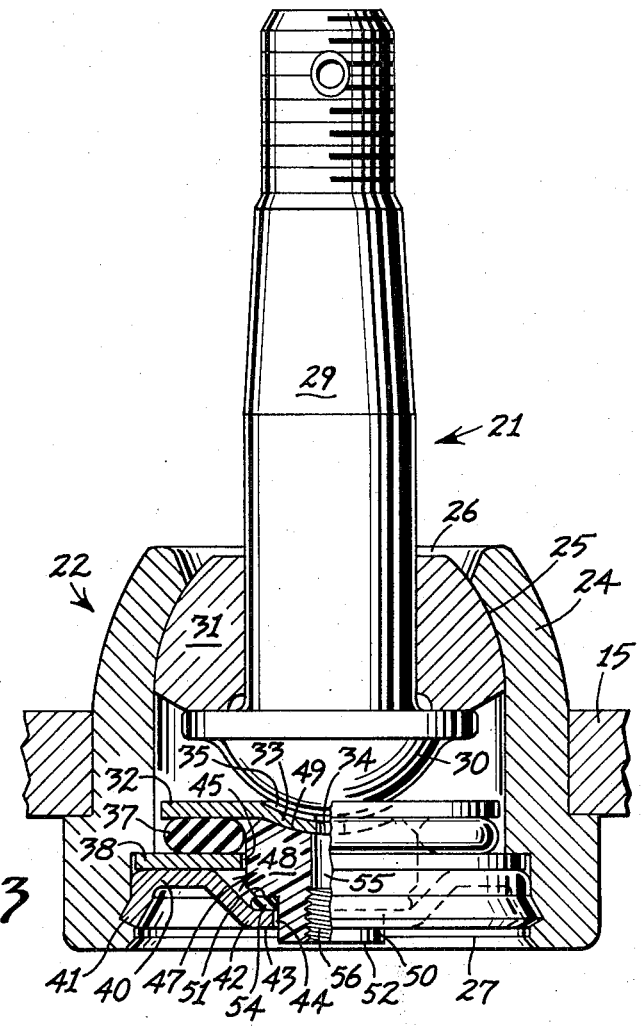
FIG. 3 is a section taken along the line 3—3 of FIG. 2.
Figure 2:
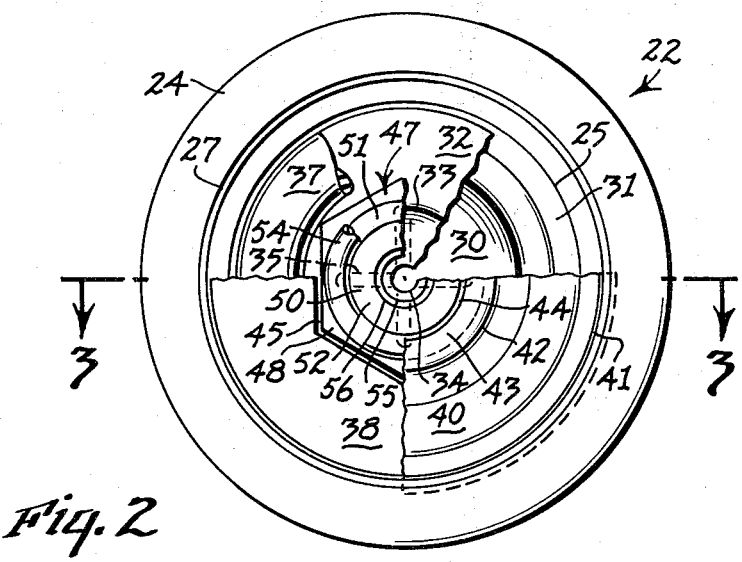
FIG. 2 is an enlarged bottom plan view of the ball joint in FIG. 1, with portions broken away.

Referring now more particularly to FIGS. 2 and 3, the lower ball joint 22 includes a housing 24 adapted to be fitted within a mating opening in the lower control arm 15. The upper end of the housing 24 comprises a spherical concave socket 25 terminating in opening 26. The lower end of the housing 24 is also provided with an opening 27.

The stud 21 includes a shank portion 29 projecting through the opening 26 and terminating at its lower end in a spherically shaped head 30. The shank portion 29 also extends through a hemispherically shaped sleeve or ball 31 seated in the socket 25 for limited universal movement.

A pressure or bearing plate 32 is provided with a bearing surface 33 in the center thereof for bearing against the spherical head 30. Extending through the center of the pressure plate 32 is a grease opening 34, and extending radially from the grease opening 34 on the upper surface of the pressure plate 32 are a plurality of radial grease tracks or grooves 35.

The pressure plate 32 is forced against the spherical head 30 by an annular elastic member in the form of a rubber ring 37 compressed by an annular retainer plate 38, which in turn is held against the compressed elastic member 37 by the cover member or cover plate 40 fixed in the open end 27 of the housing 24. In order to compress the elastic member 37, the cover member 40 is forced into the open end 27 under pressure and then the rim 41 is swedged outward into the inner wall of the housing 24 to hold the cover member 40 in place.

The center portion 42 of the cover member 40 is concave, and forms a horizontal planar reference surface 43 with a central opening 44 therethrough. The retainer plate 38 is also provided with a central opening 45.

A gauge member 47 comprises a body portion 48 having a spherical concave seat 49 for bearing against portion 33 of the pressure plate 32. The other end of the gauge member 47 comprises a cylindrical indicator or sight portion 50 of reduced diameter to form an annular ledge or recess 51. The entire gauge member 47 including the body portion 48 and indicator 50 may be a solid integral piece of hard material, such as Nylon. Hard bearing metals could also be substituted in the gauge member 47. The height of the gauge member 47 is such that the indicator or sight portion 50 projects below the reference surface 43 of the cover member 40 a vertical distance equal to the acceptable axial wear within the socket 25. In other words, when wear has occurred beyond the accepted axial limit, then the end 52 of the sight portion 50 would be flush with the reference surface 43. Thus, by either visual inspection or by feeling the flush surfaces 52 and 43, a mechanic or operator of the vehicle will know immediately that the ball joint has worn away the accepted axial distance, and the ball joint must be replaced.

Compressed between the ledge 51 and the central portion 42 of the cover member 40 is a second annular elastic member 54 whose compressive stress always forces the body portion 48 into continual engagement with the pressure plate 32, and therefore the continued engagement of the pressure plate 32 upon the spherical head 30, as wear occurs in the socket 25.

The inherent compressive stress within the annular elastic member 37 also continually urges the rim of the pressure plate 32 upward to force the spherical seat 33 against the spherical head 30, as wear occurs in the socket 25.

Extending through the center of the gauge member 47 is a vertical grease hole 55, which is internally threaded at 56 to receive a grease fitting, not shown. The grease hole 55 is aligned with the grease opening 34 and tracks 35 to permit grease to be injected to the interior of the housing 24, and particularly to the ball 31 for continual lubrication as it cooperates with the socket 25.

The central opening 45 in the retainer plate 38 is preferably non-circular and adapted to receive the body portion 48 also having the same non-circular cross-section, to prevent the gauge member 47 from rotating relative to the body 24. As disclosed in FIG. 2, the non-circular opening 45 as well as the exterior surface of the body portion 48 are hexagonal-shaped.

In the modified ball joint 62 disclosed in FIGS. 4 and 5, only the structure of the retainer plate 64, the cover member 65 and the gauge member 66 are different from the corresponding structures 38, 40 and 47 disclosed in FIGS. 2 and 3. The remaining elements, which are identical to those in the ball joint 22, are identified by identical reference numerals. Furthermore, the elements 64, 65 and 66 function in substantially the same manner as the corresponding elements 38, 40 and 47 of FIGS. 2 and 3. In the ball joint 62, the cover plate 65 is substantially coplanar, but its central opening 68 is threaded to receive the grease fitting, not shown. Two other openings 69 are formed through the cover plate 65 to receive the indicator fingers 70 which are supported by lateral arms 71 projecting radially from the rim of a cup-shaped recess member 72 for receiving the second annular elastic member 54. The cup-shaped member 72 is an enlargement of the annular body portion 73 which bears against the dished-shaped bearing seat 33 of the pressure plate 32. The exterior surface 75 of the planar cover member 65 forms the reference surface for registry with the axially movable indicator fingers 70.

The retainer plate 64 is provided with an annular outer rim 76 for bearing against the planar cover member 65, and an annular inner member 77 having opposed slots 78 for receiving the radial arms 71, and thereby prevent rotation of the gauge member 66 relative to the housing 24.

Thus, as wear occurs in the socket 25 the compressed elastic member 37 forces the pressure plate 32 upward with the spherical head 30, and the second elastic member 54 seated in the cup-shaped portion 72 and compressed against the inner surface of the cover plate 65 forces upward the gauge member 66. Accordingly, the indicator fingers 70 retract through the openings 69 by the same amount as the axial wear in the socket 25. By initially permitting the fingers 70 to protract from the reference surface 75 a distance equal to the acceptable axial wear of the ball 31, such as the standard distance of 0.050 inches, the tips of the fingers 70 will become flush with the reference surface 75 when the ball 31 has reached the limit of its acceptable wear. The tips of the fingers 70 are readily visible, or may be felt, to determine when they are flush with the reference surface 75, at which time the ball joint 62 should be replaced.

The hole 68 is coaxially aligned with the opening through the center of the body portion 73 of the gauge member 66 and the grease opening 34 and grease tracks 35 permit ready lubrication of the interior of the housing 24.

What is claimed is:

1. In a ball joint having a housing with coaxial first and second end openings, a concave socket communicating with said second end opening, an elongated stud having a substantially spherical-shaped head seated in said socket and a shank portion extending through said second end opening, a pressure plate member extending transversely of the opening axis of said housing on the opposite side of said head from said said socket, and bearing on the head for movement therewith, a gauge comprising:
   a. a gauge member having a sight portion and a body portion, said body portion bearing on said pressure plate member,
   b. a cover member fixed in said first end opening,
   c. said cover member having a reference surface relative to which said sight portion is freely movable axially to register the axial wear of said head in said socket, d. a first elastic member within said housing between said pressure plate member and said cover member, e. a retainer element fixed within said housing and normally compressing said first elastic member against said pressure plate member, and f. a second elastic member normally compressed axially between the body portion of said gauge member and said cover member.

2. The invention according to claim 1 in which said elastic members are annular, said first annular member surrounding said body portion.

3. The invention according to claim 1 in which said retainer element comprises an annular retainer plate member fitting around said body portion and holding said body portion against rotation relative to said housing.

4. The invention according to claim 1 further comprising an opening through said cover member adjacent said reference surface for receiving said sight portion for relative axial movement.

5. The invention according to claim 1 further comprising aligned grease passages through said body portion and said pressure plate member communicating with said socket member.

6. The invention according to claim 1 further comprising a recess between said body portion and said sight portion for receiving said second elastic member.

7. The invention according to claim 6 in which said gauge member is solid and the cross-section of said sight portion is less than the cross-section of said body portion to form said recess annularly around said sight portion, said second elastic member being annular for reception in said recess.

8. The invention according to claim 6 in which said body portion has a cup-shaped portion forming said recess, and said sight portion comprises a finger fixed to said cup-shaped portion and projecting axially through said cover member and registrable with said reference surface.

* * * * *